United States Patent [19]

Brown et al.

[11] Patent Number: 5,880,192
[45] Date of Patent: Mar. 9, 1999

[54] MOISTURE CROSS-LINKING OF VINYL CHLORIDE HOMOPOLYMERS AND COPOLYMERS

[75] Inventors: G. Ronald Brown, Prince George; Ved P. Gupta, Lasalle, both of Canada

[73] Assignee: McGill University, Montreal, Canada

[21] Appl. No.: 966,579

[22] Filed: Nov. 10, 1997

[30] Foreign Application Priority Data

Nov. 12, 1996 [CA] Canada ................................. 2190050

[51] Int. Cl.⁶ ................................................. C08K 5/24
[52] U.S. Cl. ................................................. 524/264
[58] Field of Search ................................. 525/331.5, 342; 524/264; 174/110 V

[56] References Cited

U.S. PATENT DOCUMENTS

| | | | |
|---|---|---|---|
| 3,646,155 | 2/1972 | Scott | 525/432 |
| 3,755,252 | 8/1973 | Buning et al. | 525/342 |
| 4,299,713 | 11/1981 | Maringer et al. | 525/342 |
| 4,400,429 | 8/1983 | Barlow et al. | 524/264 |
| 4,451,602 | 5/1984 | Furukawa et al. | 524/264 |
| 4,526,930 | 7/1985 | Keogh | 525/432 |
| 4,543,381 | 9/1985 | Barlow et al. | 524/264 |
| 4,707,520 | 11/1987 | Keogh | 125/432 |
| 4,753,993 | 6/1988 | Keogh | 264/54 |
| 5,191,019 | 3/1993 | Dahl et al. | 525/432 |
| 5,266,637 | 11/1993 | Gondard et al. | 174/110 |
| 5,561,191 | 10/1996 | Lundquist et al. | 125/432 |
| 5,738,922 | 4/1998 | Kobayashi et al. | 525/432 |

*Primary Examiner*—Veronica P. Hoke
*Attorney, Agent, or Firm*—Swabey Ogilvy Renault

[57] ABSTRACT

A vinyl chloride homopolymer or copolymer composition contains a silane, a compound capable of generating free radicals and a stabilizer comprising a lead compound or an organotin compound which is effective to prevent discoloration and degradation of the homopolymer or copolymer and does not inhibit the grafting of the vinyl silane on the homopolymer or copolymer. The graft homopolymer or copolymer is exposed to moisture to cross-link it, suitably after molding or otherwise fabricating the graft polymer to form an article. There is also provided a method of moisture cross-linking poly(vinyl chloride) and vinyl chloride copolymers.

39 Claims, No Drawings

MOISTURE CROSS-LINKING OF VINYL CHLORIDE HOMOPOLYMERS AND COPOLYMERS

BACKGROUND OF THE INVENTION i) Field of Invention

This invention relates to a method of moisture cross-linking of vinyl chloride homopolymers and copolymers. The process comprises a grafting of PVC resin with vinyltrialkoxysilane in the presence of an initiator, preferably a peroxide, followed by the hydrolysis of the alkoxy group of the silane to yield a cross-linked structure through the formations of Si—O—Si bonds.

ii) Description of Prior Art

The cross-linking of a polymer improves the physical properties of the product at elevated temperature. This includes the improvement in the thermal dimensional stability, resistance to thermal deformation, resistance to solvents, and stress cracking, etc. The usual method to cross-link poly(vinyl chloride), i.e. PVC, is to expose the PVC construct containing cross-linking agents to a high energy radiation source such as an electron beam (Salmon, J. Appl. Polym. Sci., 16, 671 (1972); Valdiserri and Reed, Rubber World, 170 (5), 40 (1974)). This method is suitable only for thin layers, since for thicker material the surface regions are degraded before significant cross-linking occurs in the interior. Because such radiation is inherently non-discriminatory, in addition to the cross-linking it tends to initiate degradation reactions in PVC that are exacerbated by any subsequent heat treatments, either in processing or in application. The conventional chemical method which is used for cross-linking polyethylene, that is with organic peroxides, is not satisfactory since the degradation of PVC predominates over cross-linking (Miller, Ind. Eng. Chem., 51, 1271 (1959); Mori and Nakaamura, J. Polym. Sci., A-1, 9, 639 (1971); Mori and Nakamura, J. Polym. Sci. Polym. Chem. Ed., 16, 1981 (1978); Mora and Nakamura, J. Appl. Polym. Sci., 22, 2685 (1978); Hjertberg, Dahl, and Sorvik, J. Appl. Polym. Sci., 37, 1239 (1989)).

Another method of cross-linking polymers is by modifying the polymer chain by chemically grafting active groups such as organofunctional silanes (Cartasegna, Rubber Chem. Technol., 59, 724 (1985)), which in the presence of water form a cross-linked product. The silane cross-linking of polyethylene is well known as Sioplas-E (Scott and Humpries, Mod. Plast., 50, 82 (1973)) and Monosil (Maillefer, Technical Paper, Reg. Tech. Conf. Soc. Plast. Eng., p. 12 (1979)) systems which are commercially established processes. The process involves the grafting of a silane group on to the backbone of polyethylene by using vinylalkoxysilanes in the presence of a peroxide initiator, by reactive compounding or, by copolymerization of ethylene with silane in the reactor. (Neste Polyetylen AB, Sweden, Information Booklet, VISICO, IN 0180 1987 03/E; Bullen, Capaccio, Frye, and Brock, Br. Polym. J., 21, 117 (1989)). This reaction is initiated by free radicals produced through the thermal decomposition of an organic peroxide. This is summarized in the reaction sequence shown below:

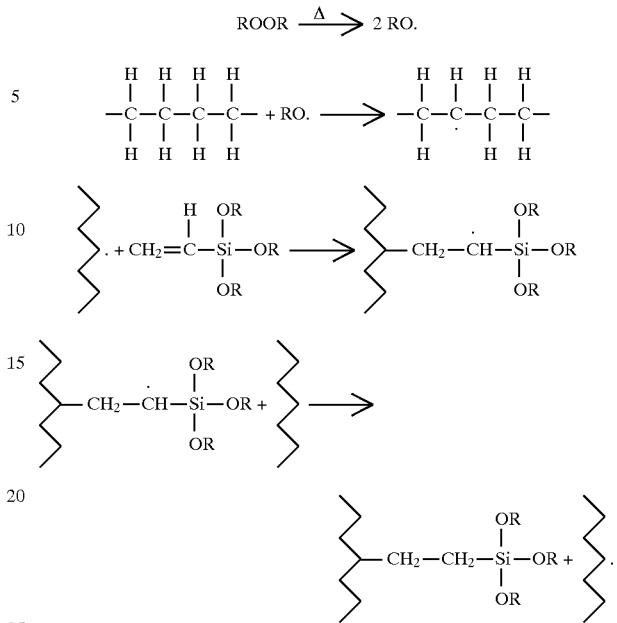

After fabricating the end product, the cross-linking is achieved through the action of water when a Si—O—Si bridge is formed by the combination of two or more pendent silane groups, as shown below. In order to accelerate the cross-linking reaction a condensation catalyst is also employed.

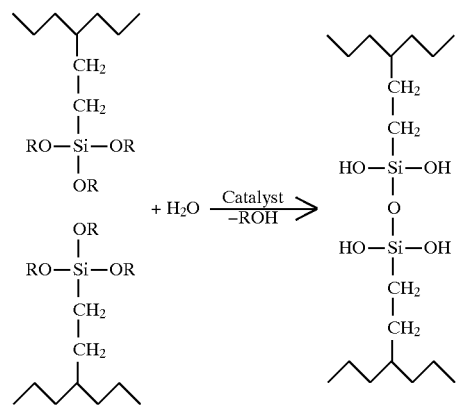

Several attempts have been made to cross-link PVC by the silane method. In 1969, the Dow Corning Co. patented a process of copolymerizing vinyl chloride with vinyl silane (Lewis, Collins, and Malani Br. Pat. 139, 248 (1969)). A second patent on this subject was obtained by Dow Corning for a process using amino silanes to cross-link the PVC (Saam and Thomas, Br. Pat. 1,485,263 (1973)). In the latter work aminosilane was grafted to the PVC by reactive processing; several other references using amino silane as a cross-linking agent are in the literature but the process has not been exploited commercially to any extent (Shindo and Hirai, Makromol. Chem., 155, (1972); Kelnar, PhD Thesis, Institute of Chemical Technology, Prague, (1988); Hearn, Baird, Nethsinghe and Gilbert, Polym. Commun., 31 (5),194 (1990); Kellner and Schatz, Sb. Vysk. Sk. Chem.-Technol. Praze, Polym., Chem.,Vlastnosti Zprac., S17, 31 (1988)). More recently, the use of mercaptosilanes as a grafting agent has also been reported (Kellner and Schatz, Sb. Vysk. Sk.

Chem.-Technol. Praze, Polym., Chem., Vlastnosti Zprac., S17, 31 (1988); Fujikura Cable Works Ltd., Japan Kokai 565,854 (1981), Chem. Abstr., 94, 209757 (1981); Fujikura Cable Works Ltd., Japan Kokai 5,796,048 (1982), Chem. Abstr., 97, 183070 (1982); Fujikura Cable Works Ltd., Japan Kokai 5,796,049 (1982), Chem. Abstr., 97, 183071 (1982); Fujikura Cable Works Ltd., Japan Kokai 5,787,438 (1982), Chem. Abstr., 97, 199068 (1982); Yamamoto, Ogawara and Hirokawa, Japan Kokai 63010605 (1988), Chem. Abstr., 109(6), 38487w; Schatz, Kelner and Vysoky Ger. Offen. 3719151 (1987), Chem. Abstr., 108(24), 205319f). Kelner and Schatz have successfully cross-linked PVC by using mercapto-alkoxy silanes with minimum degradation of PVC (Kelnar and Schatz J. Appl. Polym. Sci., 48, 657, 669 (1993)). Blends of PVC with other grafted polymers have also been used as a means to achieve the properties of the cross-linked PVC (Japan Kokai Tokyo Koho JP 60 42429 (85 42429) 1985; Hasue and Yamane, Japan Kokai 61, 243,848 (1986), Chem. Abstr.,107, 8477 (1987); Hayashi Japan. Kokai JP 53021249 (1978), Chem. Abstr., 89(10), 75893q).

In spite of considerable attempts during the last 25 years, the silane grafting process for cross-linking PVC has not been commercially exploited to any extent. Presumably this is due to the degradation of PVC which accompanies the grafting process, making the end product unacceptable. The present invention describes the moisture cross-linking of a thermoplastic PVC compound using vinyltrialkoxysilane with a minimum amount of degradation making the end product and this process commercially viable.

IMPROVEMENT OVER THE PRIOR ART

1. The use of a suitable stabilizer system to prevent the degradation of PVC during grafting/cross-linking without slowing the grafting reaction.
2. In conjunction with the right stabilizer package, a reaction condition is chosen so that the thermal degradation is minimized and grafting of silane is done at a reasonable rate.
3. By using (1) and (2), it is possible to graft/cross-link a thermoplastic flexible and rigid PVC.

SUMMARY OF THE INVENTION

It has been found that vinyl chloride homopolymers or copolymers can be moisture cross-linked without significant deterioration of properties such as color due to degradation. This improvement over the prior art is achieved by including a stabilizer system to slow the degradation of the PVC without affecting the grafting reaction. The resin can be grafted by the reactive processing of the vinyl chloride homopolymer or copolymer with vinyltrialkoxysilane using an initiator by known methods. This grafted compound is converted into the desired shape of the end product which is then cross-linked by exposing it to moisture.

In accordance with one aspect of the invention there is provided a thermoplastic composition comprising:
(a) a vinyl chloride homopolymer or copolymer,
(b) a silane of structure R'R"SiY$_2$ where, R' is a monovalent unsaturated hydrocarbon or hydrocarbonoxy radical, Y is a hydrolyzable organic group and R" is a R' or a Y radical,
(c) a compound capable of generating free radicals in (a) at the processing temperature, having a suitable half-life, and
(d) a compound comprising a lead compound or an organotin compound, said compound being effective to prevent discoloration and degradation of (a), and being non-inhibiting to grafting of said silance (b) on (a).

In another aspect of the invention there is provided a process for producing a cross-linked vinyl chloride homopolymer or copolymer composition which comprises i) grafting a vinyl chloride homopolymer or copolymer with a silane by the reactive processing of a composition of the invention defined hereinbefore, the reaction being carried out at a temperature above 150° C., and ii) exposing the graft product of i) to moisture in the presence of a silanol condensation catalyst.

The blend of the invention can be reactively processed at an elevated temperature to obtain a graft of the silane on the vinyl chloride polymer or copolymer. This thermoplastic compound can then be cross-linked in the presence of moisture and a product of superior properties at elevated temperature and a gel content in excess of 70%, by weight, can be obtained. A small amount of a silanol condensation catalyst such as dibutyltin dilaurate can be used to accelerate the cross-linking reaction.

DETAILED DESCRIPTION OF THE INVENTION

According to this invention, the cross-linking of a thermoplastic vinyl chloride homopolymer or copolymer comprises the following steps in the presence of a suitable stabilizer package:
(A) Graft copolymerization of vinyl chloride homopolymer or copolymer with the silane and (B) the subsequent reaction of the silane-modified homopolymer or copolymer from (A) with water in the presence of a silanol condensation catalyst.

The above reactions are carried out under conditions of low severity in order to minimize the thermal degradation of the homopolymer or copolymer, which generates HCl and a colored end product of poor physical properties. The discoloration of the product is an indication of the early stage of the degradation of the homopolymer or copolymer which deteriorates the physical properties and makes the product more unstable. During the grafting reaction, in addition to less severe processing conditions, a stabilizer package is used to minimize the degradation without affecting the grafting reaction of silane to the homopolymer or copolymer.

(Step A) Grafting of PVC and its Copolymers:

In this specification hereinafter reference to PVC compound is to be understood as a reference to vinyl chloride homopolymer or copolymer.

Copolymers of vinyl chloride typically contain vinyl chloride and up to about 30%, by weight, preferably up to 20%, by weight, based on the weight of the copolymer of a comonomer which copolymerizes with vinyl chloride monomer, for example, vinyl acetate.

The PVC compound suitably has a K value, a measure of molecular weight, of about 50 to 95.

The PVC compound is dry blended with a silane of structure R'R"SiY$_2$ (where, R' is a monovalent unsaturated hydrocarbon or hydrocarbonoxy radical, Y is a hydrolyzable organic group and R" is a R' or a Y radical and an initiator capable of generating free radicals in the PVC compound at the processing temperature. A suitable stabilizer system is also incorporated in order to prevent the degradation of the PVC compound. The dry blend is then subjected to a reactive processing reaction using conventional methods at a temperature between 150° C. and 205° C., although higher and a lower temperatures can also be used. The actual temperature and time will normally depend on the type of processing equipment used.

The silane used in this invention is of the general formula R'R"SiY$_2$ where R' may be a singly bonded unsaturated hydrocarbon radical or hydrocarbonoxyl substituent which is reactive with free radical sites generated in the PVC compound. Examples of unsaturated hydrocarbon groups are vinyl-, allyl-, 2-methylallyl-, butenyl-, cyclohexenyl-, cyclopentadienyl-, and octadienyl- and examples of hydrocarbonoxy groups include allyloxy-, 2-methylallyloxy-, $CH_2=C(CH_3)—COOCH_2CH_2CH_2—$, $CH_2=C(CH_3—COOCH_2CH_2OCH_2CH_2CH_2—$ and $CH_2=C(CH_3)—COOCH_2OCH_2CH(OH)CH_2OCH_2CH_2CH_2—$ The vinyl group is most preferred. The Y group, capable of being split off by hydrolysis may be an alkoxy group such as methoxy, ethoxy, propoxy or butoxy; an acyloxy group such as formyloxy, acetoxy or propionoxy; an oxime group such as $—ON=C(CH_3)_2$, $—ON=CCH_2C_2H_5$, or $—ON=C(C_6H_5)_2$ The R" may be R' or Y. The silane compound preferably contains 3 hydrolyzable groups. Of these, the alkoxy groups are especially preferred. The vinyltrialkoxysilanes such as vinyltrimethoxysilane and vinyltriethoxysilane can be conveniently used in the present invention.

The amount of silane used will depend on the type of the PVC compound, other ingredients present in the formulation, the degree of cross-linking required and on the reaction conditions used. Generally, its amount varies from 0.5 to about 25 parts, preferably 0.5 to 20 parts, and more preferably 0.5 to about 15 parts by weight, per 100 parts by weight of the resin.

The grafting reaction may suitably take place at a temperature above 150° C., preferably 160° to 210° C., more preferably 170° to 210° C.

The free radical generating compound used in this technology, is a compound which is capable of producing free radical sites on the PVC compound chain at the reaction temperature. The best known free radical generating compounds are organic peroxides and peresters such as benzoyl peroxide, dichlorobenzoyl peroxide, dicumyl peroxide, di-t-butyl peroxide, lauroyl peroxide, t-butyl peroxyisobutyrate, t-butyl peracetate, t-butyl peroxy-2-ethylhexanoate, t-butyl peroxy benzoate, 2,5-dimethyl-2,5-di(t-butyl peroxy) hexane, 2,5-dimethyl-2,5-di(t-butyl peroxy)hex-3-yne, 2,5-di(peroxybenzoate)hex-3-yne or 1,3-bis(t-butyl-peroxyisopropyl) benzene; and azo compounds such as azobis(isobutyronitrile) or dimethyl azodiisobutyrate.

Typically the free radical generating compound has a half life of less than 5 minutes at the reaction temperature.

The selection of the free radical generating compound depends upon the temperature at which the PVC compound is reacted with the silane. In the present invention, for example, at processing temperatures of 160° to 170° C., dicumyl peroxide which has a half life of about 25 seconds at this temperature, is preferred. If the reaction is carried out at a lower temperature for example at 155° C., benzoyl peroxide, having a preferred half life, is suitable. In selecting an initiator for grafting to the PVC, another important factor to consider, is its side reactions.

The free radical generating compound is suitably employed in an amount of about 0.05 to 1.5 parts, preferably 0.05 to 1.0 parts, by weight, per 100 parts by weight of PVC compound.

In a PVC compound there are other ingredients present which may interfere with the decomposition of the initiator and/or it is possible that the initiator may react with them to produce an undesirable product. An evaluation of the initiator for a particular PVC compound is highly recommended. A free radical initiator which gives a maximum degree of grafting and a minimum discoloration of the PVC compound is most preferred.

When an unmodified PVC compound is subjected to heat or light, the compound becomes discolored, HCl is evolved and physical properties are lost. To minimize or eliminate these effects, a stabilizer is added in accordance with the invention.

In accordance with the invention, the customary stabilizing systems, known from PVC technology, are based on lead, barium/cadmium, barium/zinc, calcium/zinc, organotin compounds or organic stabilizers, individually or in combination. Hundreds of stabilizers and stabilizer combinations are available in the PVC industry and for a more detailed list of these references is made to Encyclopedia of PVC Vol. 2, L. I. Nass and C. A. Heiberger, Marcel Dekker, Inc, 1988. Some common stabilizers from each class are given below:

Lead based compounds include—Lead oxide, basic lead carbonate, tribasic lead sulfate, basic lead silicate sulfate, dibasic lead phthalate, dibasic lead phosphite, dibasic lead stearate, lead stearate and lead 2-ethylhexoate. Organo-tin compounds are usually alkyltin carboxylates such as dibutyltin dilaurate, dibutyltin maleate, dibutyltin bis(isooctyl maleate), dioctyltin maleate; and alkyltin mercaptides such as dibutyltin bis(lauryl mercaptide), dibutyltin bis(isooctyl mercaptoacetate), and dimethytin bis(2-mercaptoethyloleate). The mixed metal stabilizers, non organotin containing stabilizers are mixtures of barium, calcium, cadmium, and zinc soaps. The organic stabilizers are generally used in combination with metallic stabilizers. These are, for example, organic phosphites, epoxides and epoxidized soybean oils, and octyl epoxy tallate, etc. In addition to these antioxidants, they may also be included in the proprietary stabilizer systems.

The stabilizer is suitably employed in an amount of about 1 to about 12 parts, by weight, per 100 parts, by weight, of PVC compound.

In selecting a stabilizer system, in addition to the thermal stability of the compound during processing and also during the service life of the end product, other factors such as its efficiency and effect on the grafting reaction should be considered. The stabilizer package should be able to retain the original color (i.e., keeping the extent of degradation of PVC compound to a minimum) of the PVC compound without slowing down the grafting reaction of silane to PVC compound. Lead-based compounds such as tribasic lead sulfate and the organotin compound, T35 obtained from Elf Atochem are found to be especially suitable in the present invention.

Optimally a plasticizer for the PVC compound may be included. Suitable plasticizers are esters of aromatic acids such as phthalates and trimellitates, and phosphate esters such as tri-butyl phosphate. The plasticizer is suitably present in an amount of 0 to 120 parts, preferably up to 60 parts, by weight, per 100 parts, by weight, of PVC compound.

Preferred plasticizers include dialkyl phthalates which are esters of phthalic anhydride and an alcohol of $C_4$ to $C_{13}$ carbon atoms, for example, di(2-ethylhexyl) phthalate, di(isodecyl)phthalate, di(n-hexyl, n-octyl or n-decyl) phthalate, diundecyl phthalate and ditridecyl phthalate; trimellitate esters for example tri(2-ethylhexyl) trimellitate or trioctyltrimellitate, and tri(n-hexyl, n-octyl or n-decyl) trimellitate; and trialkyl, triaryl or mixed alkyl-aryl phosphates, for example, tributyl phosphate and tricresyl phosphate.

Step (B) Moisture Cross-linking of the Thermoplastic PVC Graft Prepared in Step (A):

The cross-linking of the silane modified thermoplastic compound is achieved by exposing the compound prepared in step (A), usually after shaping by usual methods such as extrusion, molding etc., to moisture in the presence of a silanol condensation catalyst. The presence of HCl in the PVC compound due to some dehydrochlorination of the PVC can also cause some cross-linking at normal ambient conditions. Exposure to atmospheric moisture may be sufficient to start the cross-linking reaction but the rate may be slow. The reaction can be accelerated by immersing the product in water at an elevated temperature or by exposing it to steam.

A wide variety of silanol condensation catalysts are known in the industry for cross-linking polyethylene using moisture curing technology. Such materials include, for example, metal carboxylates such as dibutyltin dilaurate, dibutyltin diacetate, stannous octoate, stannous acetate, lead naphthenate, cobalt naphthenate and zinc octoate; organometallic compounds such as tetrabutyl titanate, tetranonyl titanate and bis(acetylacetonyl) di-isopropyl titanate, organic bases such as amines; and acids such as mineral acids and fatty acids.

The preferred catalysts are dibutyltin dilaurate and dibutyltin diacetate. These catalyst may be incorporated prior to, during or following the grafting reaction. In general, as is the case with moisture cross-linking of polyethylene using this technology, it is preferred to incorporate the catalyst into the silane-modified PVC compound (step A) just prior to shaping the material into the finished article. This is usually done in the form of a masterbatch of catalyst using unmodified PVC compound as a carrier. Care must be taken not to dilute the grafted compound too much. The amount of silanol condensation catalyst can be varied according to the type and the amount of the silane bonded to the PVC resin. A catalyst (dibutyltin dilaurate) concentration of 0.1 to 10.0 parts, preferably 0.1 to 5 parts, by weight, per 100 parts of the grafted PVC resin is suitable.

EXAMPLES

The following examples are provided to illustrate rather than limit the scope of the present invention.

Grafting of the PVC Resin:

The PVC compounds were dry blended with a vinyltrialkoxysilane of structure R'Si(OR")$_3$ where, R'=vinyl and R"=alkyl group of chain length of 1 to 3 carbon atoms, and a peroxide such as dicumyl peroxide. The dry blend was then subjected to a reactive processing reaction using the mixing bowl of a Haake Plastograph equipped with sigma blades. The material was fluxed at a temperature 160°–170° C., using a rotor speed of 60 rpm, for 10–20 minutes. The fluxed compound was then compression molded to form a sheet of thickness 0.20 cm.

Crosslinking and the Measurement of the Degree of Cross-linking:

The pressed sheet obtained above was immersed in water at 85°–90° C. containing 0.5% of dibutyltin dilaurate for a predetermined time to give a maximum percent of cross-linking. The degree of cross-linking, after exposure to water was evaluated by determining the percent gel remaining after extraction in boiling tetrahydrofuran for 12 hr. The percent gel obtained for the compound was normalized for the amount of PVC resin present.

Hot Creep Elongation and Hot Creep Set:

This method is based on the Insulated Cable Engineers Association (ICEA) publication #T-28-562, which is used for determining the relative degree of cross-linking of polymeric materials, namely polyethylene used in the wire and cable industry. A specimen which is subjected to a load of 29 psi. was suspended in an air oven at 132° C. for 10 minutes. These conditions were found to be satisfactory for the PVC compounds. After 10 minutes the increase in elongation was determined and is reported as Hot Creep Elongation in %. For Hot Creep Set, the load from the specimen is removed and the specimen is subjected to an additional 5 minutes in the oven and then allowed to cool at the room temperature for at least one hour. The hot creep set of the specimen based on the original length is calculated. The noncross-linked sample, under above conditions, melts.

Section A Grafting and Cross-linking of Rigid PVC

Example A1.

Grafting and Cross-linking of Rigid PVC:

The Formulations used to graft a rigid PVC compound are given in Table 1:

TABLE 1

Formulation for grafting rigid PVC

| | 1 | 2 | 3[a] | 4 | 5 |
|---|---|---|---|---|---|
| PVC K = 66 | 100 | 100 | 100 | | |
| Tri-basic lead sulfate | 6 | | | | |
| T35*, a Tin based stabilizer | | 5 | 5 | | |
| TiO$_2$ | 5 | 5 | | | |
| Vinyltrimethoxysilane | 10 | 10 | 10 | 10 | 10 |
| Dicumyl peroxide | 0.5 | 0.5 | 0.5 | 0.75 | 0.75 |
| Calcium stearate | | | | | |
| Stearic acid | 1 | 1 | 1 | | |
| Bisphenol A | 1 | 1 | 1 | | |
| Dioctyl phthalate (DOP)[2] | 5 | 5 | 5 | | |
| Dibutyl tin dilaurate | | | 0.5 | | |
| Commercial 8007 window formulation | | | | 100 | |
| Commercial 9005 vertical blind formulation | | | | | 100 |
| % Gel, (% Crosslinking) | 61 | 85 | 95 | 90 | 75 |
| Color change[1] | vs | vs | vs | vs | vs |

*obtained from Elf-Atochem,
[a]no catalyst was used during exposure to water for cross-linking
[1]Color change in the sample after grafting/cross-linking, vs: very slight, almost no change
[2]Also known as di(2-ethylhexyl phthalate)

The compounds 1 to 3 were formulated in the laboratory and 4 and 5 were commercial polyvinyl chloride samples obtained from the field. These compounds were prepared by reactive processing using the Haake Plastograph mixing chamber under the conditions given above. The percent gel obtained on these samples, after exposure in hot water for 4 days, were in the range of 61 to 95 % compared to zero obtained from the ungrafted samples and also the color change in the cross-linked samples were almost nil compared to the ungrafted samples.

Section B Grafting of Flexible PVC

In this section the effect of the following on the degree of grafting (% gel) are demonstrated:

B.1 Amount of plasticizer (D.O.P.)

B2. Amount of reactive silane

B3. Amount of peroxide

B.4 Use of various silanes

B.5 Type of plasticizer

B.6 Type of stabilizers

B.7 Effect of fillers

B.8 Effect of molecular weight of the PVC resin

B.9 Use of vinyl chloride and vinyl acetate copolymer

Example B.1

Amount of Plasticizer D.O.P:

Formulations used for grafting flexible PVC using various amounts of the plasticizer dioctyl phthalate (D.O.P) are given in Table 2:

TABLE 2

Effect of D.O.P level

|  | 1 | 2 | 3 | 4 | 5 | 6 |
|---|---|---|---|---|---|---|
| PVC, K = 66 | 100 | 100 | 100 | 100 | 100 | 100 |
| D.O.P | 30 | 30 | 50 | 50 | 65 | 65 |
| Tri-basic lead sulfate | 6 | 6 | 6 | 6 | 6 | 6 |
| Stearic Acid | 0.25 | 0.25 | 0.25 | 0.25 | 0.25 | 0.25 |
| Vinyltrimethoxysilane |  | 10 |  | 10 |  | 10 |
| Dicumyl peroxide |  | 0.4 |  | 0.4 |  | 0.4 |
| Color change[1] |  | vs |  | vs |  | vs |
| Gel, % | 0 | 86 | 0 | 90 | 0 | 88 |

[1]Color change in the samples 2, 4, 6 after grafting/cross-linking from ungrafted sample 1; 3 and 5. vs: very slight, almost no change The above formulations were grafted and cross-linked using the procedure given in the Experimental section. In every case when the silane and dicumyl peroxide were present, percent gel (cross-linking) in excess of 86% were obtained showing no effect on percent gel of the amount of D.O.P. The color change in cross-linked samples 2,4,6 compared to the ungrafted compounds 1,3,5 was minimal. This table reveals that (a) a flexible PVC compound can be grafted and cross-linked using the moisture cross-linking method, (b) the amount of plasticizer does not effect the % cross-linking of the resin, and (c) also the color shift in the cross-linked material is almost imperceptible.

Example B2

Effect of Amount of Reactive Silane:

In the following table, the formulations used to study the amount of grafting agent, silane, along with the % gel obtained after grafting and cross-linking, are given.

TABLE 3

Amount of reactive silane

|  | 1 | 2 | 3 | 4 | 5 |
|---|---|---|---|---|---|
| PVC, K = 66 | 100 | 100 | 100 | 100 | 100 |
| D.O.P | 50 | 50 | 50 | 50 | 50 |
| Tri-basic lead sulfate | 6 | 6 | 6 | 6 | 6 |
| Stearic acid | 0.25 | 0.25 | 0.25 | 0.25 | 0.25 |
| Vinyltrimethoxysilane | 0 | 6 | 8 | 13 | 15 |
| Dicumyl peroxide | 0.5 | 0.35 | 0.35 | 0.35 | 0.4 |
| Color change[1] | vs | vs | vs | vs | vs |
| Gel, % | 0 | 62 | 76 | 81 | 90 |

[1]Color change in the sample after grafting/cross-linking, vs: very slight, almost no change.

As can be seen, the percent gel increases with the amount of vinyl trimethoxysilane.

Example B.3

Effect of Peroxide Concentration:

In order to study the effect of change in the amount of dicumyl peroxide on the extent of grafting/cross-linking, the following compounds were used.

TABLE 4

Effect of dicumyl peroxide concentration on grafting

|  | 1 | 2 | 3 | 4 |
|---|---|---|---|---|
| PVC, K = 66 | 100 | 100 | 100 | 100 |
| D.O.P | 50 | 50 | 50 | 50 |
| Tri-basic lead sulphate | 6 | 6 | 6 | 6 |
| Stearic Acid | 0.25 | 0.25 | 0.25 | 0.25 |
| Vinyltrimethoxysilane | 10 | 10 | 10 | 10 |
| Dicumyl peroxide | 0 | 0.22 | 0.31 | 0.5 |
| Color change[1] |  |  | vs | vs |
| Gel, % | 0 | 0 | 78 | 91 |

[1]Color change in the sample after grafting/cross-linking, compared to ungrafted sample. vs: very slight, almost no change.

It is evident from the above data that at least 0.3 phr of dicumyl peroxide is required to get a satisfactory degree of gel content.

Example B.4

Use of Various Silanes:

The following table demonstrates the use of various reactive silanes of structure $R'Si(OR'')_3$, where $R'$=vinyl $CH_2$=CH and $R''$=alkyl group of chain length of 1 to 3 carbon atoms for grafting/cross-linking.

TABLE 5

Use of various reactive silanes

|  | 1 | 2 | 3 |
|---|---|---|---|
| PVC, K = 66 | 100 | 100 | 100 |
| D.O.P | 50 | 50 | 50 |
| Tri-basic lead sulfate | 6 | 6 | 6 |
| Vinyltrimethoxysilane | 10 |  |  |
| Vinyltriethoxysilane |  | 13 |  |
| Vinyltriisopropoxysilane |  |  | 15 |
| Dicumyl peroxide | 0.35 | 0.5 | 0.5 |
| Stearic Acid | 0.25 | 0.25 | 0.25 |
| Gel, % | 90 | 76 | 7 |

The percent gel obtained for the above formulations indicates that these silanes can be used as a grafting agents. The amount of silane and peroxide as well as the reactive processing conditions depends on the type of silane and must be optimized.

Example B.5

Effect of Type of Plasticizers:

The effect of a general purpose plasticizer dioctyl phthalate, a high temperature plasticizer trioctyl trimellitate and other phthalate esters formed with linear alcohols as well as the phosphate ester tri butyl phosphate, on grafting are demonstrated in the following table.

TABLE 6

Effect of type of plasticizers

|  | 1 | 2 | 3 | 4 | 5 |
|---|---|---|---|---|---|
| PVC, K = 66 | 100 | 100 | 100 | 100 | 100 |
| Dioctyl phthalate (D.O.P) | 50 |  |  |  |  |
| Di $(C_7/C_{11})$ P[a] |  | 50 |  |  |  |
| Di $(C_9/C_{10})$ P[b] |  |  | 50 |  |  |
| Trioctyl trimellitate (T.O.T.M) |  |  |  | 50 |  |

TABLE 6-continued

Effect of type of plasticizers

|  | 1 | 2 | 3 | 4 | 5 |
|---|---|---|---|---|---|
| Tributyl phosphate (T.B.P) |  |  |  |  | 50 |
| Tri basic lead sulfate | 6 | 6 | 6 | 6 | 6 |
| Stearic Acid | 0.25 | 0.25 | 0.25 | 0.25 | 0.25 |
| Vinyltrimethoxysilane | 10 | 10 | 10 | 10 | 10 |
| Dicumyl peroxide | 0.35 | 0.35 | 0.35 | 0.35 | 0.35 |
| Gel, % | 90 | 83 | 85 | 78 | 95 |
| Color change[1] | vs | vs | vs | vs | vs |
| % Hot creep | 35 | 39 | 25 |  | 18 |
| % Hot Creep set | 6.5 | 6.3 | 6.6 |  | 5 |

[a]Phthalate ester of linear $C_7/C_{11}$ alcohol,
[b]Phthalate ester of linear $C_8/C_{10}$ alcohol.
[1]Color change in the sample after grafting/cross-linking compared to un-crosslinked sample, vs: very slight, almost no change.

The above compounds were grafted and cross-linked following the procedure given in the experimental section. In every case a "blank" sample (i.e. without silane and peroxide) was run and the percent gel was found to be zero compared to the formulations with silane and peroxide which yielded a gel in the range of 78 to 95%. This table reveals that common plasticizers used in the industry do not effect the % cross-linking obtained by this method.

Example B.6

Effect of the Type of Stabilizer:

Two types of stabilizers were chosen in the present study. These are (a) a lead-based stabilizer which is widely used in the wire and cable industry and (b) a tin-based stabilizer which is very common in the rigid PVC industry, for window profiles etc. These formulation along with the percent gel obtained on the cross-linked samples are given in Table 7.

TABLE 7

Effect of type of stabilizer

| PVC, K = 66 | 100 | 100 |
|---|---|---|
| D.O.P | 50 | 50 |
| Tri basic lead sulfate | 6 |  |
| T35*, a Tin stabilizer |  | 3 |
| Vinyltrimethoxysilane | 10 | 10 |
| Dicumyl peroxide | 0.35 | 0.35 |
| Stearic Acid | 0.25 | 0.25 |
| Gel, % | 90 | 91 |
| Color change[1] | vs | vs |
| % Hot Creep | 35 | 15.3 |
| % Hot Creep Set | 6.5 | 3.3 |

*obtained from Elf Atochem
[1]Color change in the sample after grafting/cross-linking compared to un-crosslinked sample, vs: very slight, almost no change.

In both cases a high percent gel was obtained and the initial color of the ungrafted sample was maintained.

Example B.7

Effect of Fillers:

In PVC compounds $CaCO_3$ is commonly used as a filler to reduce the cost of the product and sometimes $TiO_2$ is included as a whitening agent and/or as a UV screener. The effect of these additives on the gel % along with the formulations are given in the following table.

TABLE 8

Effect of fillers

| PVC, K = 66 | 100 | 100 | 100 |
|---|---|---|---|
| D.O.P | 50 | 50 | 50 |
| Tri-basic lead sulfate | 6 | 6 | 6 |
| Vinyltrimethoxysilane | 10 | 10 | 10 |
| Dicumyl peroxide | 0.35 | 0.35 | 0.35 |
| $CaCO_3$ | 50 |  |  |
| $TiO_2$ |  |  | 4 |
| Stearic Acid | 0.25 | 0.25 | 0.25 |
| Gel, % | 70 | 78 | 77 |

As is clear from the above table, the use of mineral fillers does not interfere with the grafting/cross-linking reaction and the products retain the original color.

Example B.8

Effect of the Resin Molecular Weight (K Value):

The following table demonstrates the effect of resin molecular weight on the grafting reaction.

TABLE 9

Effect of resin K value

| PVC, K = 66 | 100 |  |
|---|---|---|
| PVC, K = 95 |  | 100 |
| D.O.P | 50 | 50 |
| Tri-basic lead sulphate | 6 | 6 |
| Vinyltrimethoxysilane | 10 | 10 |
| Dicumyl peroxide | 0.35 | 0.35 |
| Stearic Acid | 0.25 | 0.25 |
| Color change[1] | vs | vs |
| Gel, % | 90 | 93 |
| % Hot Creep | 35 | 12.6 |
| % Hot Creep Set | 6.5 | 1.58 |

[1]Color change in the sample after grafting/cross-linking compared to un-crosslinked sample. vs: very slight, almost no change.

As expected no difference on % gel was noticed.

Example B.9

Use of Vinyl Chloride-vinyl Acetate Copolymer as a Base Resin:

The formulation used to study the grafting of a copolymer of vinyl chloride and vinyl acetate is given in the following table. In this work a copolymer containing 18% vinyl acetate was used.

TABLE 10

Vinyl chloride-vinyl acetate copolymer as a base resin

| P(VC-VA)* | 100 |
|---|---|
| D.O.P | 52 |
| Tri-basic lead sulfate | 6.2 |
| Vinyltrimethoxysilane | 11 |
| Dicumyl peroxide | 0.41 |
| Stearic Acid | 0.2 |
| Color change[1] | vs |
| Gel, % | 71 |

[1]Color change in the sample after grafting/cross-linking compared to un-crosslinked sample, vs: very slight, almost no change;
*a copolymer of vinyl chloride and vinyl acetate, vinyl acetetate content 18%.

It is evident from the above table that the moisture cross-linking technique can successfully be employed with the vinyl chloride/vinyl acetate copolymer system.

In the foregoing examples, it has been demonstrated that:
the PVC resin, in rigid as well as in flexible compounds, can be grafted with vinyl trialkoxysilane using a conventional reactive processing method, the grafted resin is cross-linked in the presence of moisture, the common ingredients used in PVC compounds do not affect the grafting/cross-linking reaction.

and a minimal color change (almost no color change) after cross-linking from the original ungrafted samples was obtained.

Although the invention has been described in detail in the foregoing examples for the purpose of illustration, it is to be understood that such detail is solely for that purpose and that variations can be made therein by those skilled in the art without departing from the spirit and scope of the invention except as it may be limited by the claims.

We claim:

1. A thermoplastic composition comprising:
   (a) a vinyl chloride homopolymer or copolymer,
   (b) a silane of structure R'R"SiY$_2$ where R' is a monovalent unsaturated hydrocarbon or hydrocarbonoxy radical, Y is a hydrolyzable organic group and R" is a R' or a Y radical, said silane being present in an amount to produce a graft vinyl chloride homopolymer or copolymer which is moisture cross-linkable to produce a cross-linked product having a gel content in excess of 70%. by weight,
   (c) a compound capable of generating free radicals in (a) at the processing temperature, having a suitable half-life, and
   (d) a thermally stabilizing amount of a compound comprising a lead compound or an organotin compound, said compound being effective to prevent discoloration and degradation of (a), and being present during the grafting step.

2. A composition according to claim 1 wherein (a) is a polyvinyl chloride homopolymer having a K value (molecular weight) of about 50 to 95.

3. A composition according to claim 1 wherein (a) is a vinyl chloride copolymer containing vinyl chloride and up to 30%, by weight, based on the weight of the copolymer, of at least one co-monomer which is copolymerizable with vinyl chloride monomer.

4. A composition according to claim 1 comprising 0.5 to 25 parts of (b), about 0.05 to 1.5 parts of (c) and 1 to 12 parts of (d), by weight, per 100 parts of (a).

5. A composition according to claim 4 further including up to 120 parts, by weight, of a plasticizer system containing an ester of a di- or tri-basic aromatic acid and/or a phosphate ester.

6. A composition according to claim 1 wherein the silane is a vinyltrialkoxysilane.

7. A composition according to claim 6 wherein the silane is vinyltrimethoxysilane.

8. A composition according to claim 6 wherein the silane is vinyltriethoxysilane.

9. The composition according to claim 6 wherein the silane is vinyltriisopropoxysilane.

10. A composition according to claim 1 wherein the free radical generating compound has a half-life of less than 5 minutes at the reaction temperature.

11. A composition according to claim 10 wherein the free radical generating compound is benzoyl peroxide and the processing temperature is about 155° C.

12. A composition according to claim 10 wherein the free radical generating compound is dicumyl peroxide at a reaction temperature about 160° to 210° C.

13. A composition according to claim 1 wherein the stabilizer is a lead-based compound.

14. A composition according to claim 13 wherein the lead compound is tribasic lead sulfate.

15. A composition according to claim 13 wherein the lead compound is dibasic lead phthalate.

16. A composition according to claim 13 wherein the lead compound is basic lead silicate sulfate.

17. A composition according to claim 13 wherein the amount of lead compound is 1 to 15 parts by weight, per 100 parts of (a).

18. A composition according to claim 1 wherein the stabilizer is an organotin compound.

19. A composition according to claim 18 wherein the organotin is an alkyl tin mercaptide such as T35 from Elf Atochem.

20. A composition according to claim 18 wherein the amount of organotin compound is 1 to 10 parts (a).

21. A composition according to claim 5 wherein the plasticizer system comprises a dialkyl phthalate.

22. A composition according to claim 21 wherein the dialkyl phthalate is an ester of phthalic anhydride and an alcohol of carbon chain length $C_4$ to $C_{13}$.

23. A composition according to claim 21 wherein the dialkylphthalates is selected from di(2-ethylhexyl)phthalate, di(isodecyl) phthalate, di(n-hexyl, n-octyl, n-decyl) phthalate, diundecyl phthalate, and ditridecyl phthalate.

24. A composition according to claim 21 wherein the amount of dialkyl phthalate is 0 to 120 parts by weight, per 100 parts of (a).

25. A composition according to claim 5 wherein the plasticizer system comprises a trimellitate ester.

26. A composition according to claim 25 wherein the trimellitate ester is tri(2-ethylhexyl) trimellitate, usually known as trioctyl trimellitate.

27. A composition according to claim 25 wherein the trimellitate ester is tri(n-hexyl,n-octyl, n-decyl) trimellitate.

28. A composition according to claim 25 wherein the amount of trialkyl trimellitate is 0 to 120 parts by weight, per 100 parts of (a).

29. A composition according to claim 1 wherein the plasticizer system comprises a trialkyl phosphate, triaryl phosphate, or a mixed alkyl-aryl phosphate.

30. A composition according to claim 5 wherein the phosphate ester is a tributyl phosphate or tricresyl phosphate.

31. A composition according to claim 29 wherein the amount of trialkyl phosphate is 0 to 60 parts by weight, per 100 parts of (a).

32. A process for producing a cross-linked vinyl chloride homopolymer or copolymer composition, which comprises:
   (i) a grafting reaction of a vinyl chloride homopolymer or copolymer resin with a silane by the reactive processing of a composition in accordance to claim 1, wherein said reaction is carried out at a temperature above 150° C., and
   (ii) exposing the product of (i) to moisture in the presence of a silanol condensation catalyst.

33. A process as claimed in 32 wherein step (i) is carried out at a temperature in the range from 160° to 210° C.

34. A process as claimed in 32 wherein step (i) is reactive processing in which the homopolymer or copolymer is subjected to mechanical working during compounding or during fabrication steps.

35. A process as claimed in 32 wherein the silanol condensation catalyst is added to said composition prior to step (i).

36. A process as claimed in 32 wherein the product after step (i) (a) is blended with a silanol condensation catalyst, (b) is shaped to the final product, and (c) then exposed to the moisture, step (ii) of claim 32.

37. A process as claimed in 32 wherein the silanol condensation catalyst is a metal carboxylates such as dibutyltin dilaurate, dibutyltin diacetate, stannous octoate, stannous acetate, lead naphthenate, cobalt naphthenate, zinc octoate.

38. A process as claimed in 32 wherein the silanol condensation catalyst is dibutyltin dilaurate or dibutyltin diacetate.

39. A process as claimed in 32 wherein the amount of silanol condensation catalyst dibutyltin dilaurate, or dibutyltin diacetate, is 0.10 to 5.0 parts by weight, per 100 parts of (a).

* * * * *